(12) United States Patent
Dufresne et al.

(10) Patent No.: US 6,369,192 B1
(45) Date of Patent: Apr. 9, 2002

(54) METHODS FOR REMOVING CONTAMINANTS FROM POLYMERS

(75) Inventors: Louise Anne Dufresne, Brights Grove (CA); Rajat Darshan Agrawal, Bolingbrook, IL (US)

(73) Assignee: Praxair Technology, Inc., Danbury, CT (US)

( * ) Notice: Subject to any disclaimer, the term of this patent is extended or adjusted under 35 U.S.C. 154(b) by 0 days.

(21) Appl. No.: 08/738,366

(22) Filed: Oct. 25, 1996

Related U.S. Application Data

(60) Provisional application No. 60/005,985, filed on Oct. 27, 1995.

(51) Int. Cl.⁷ ................................................. C08F 6/00
(52) U.S. Cl. ................. 528/483; 528/308.2; 528/487; 528/490; 528/498; 528/500; 528/501; 159/47.1
(58) Field of Search ............................. 528/483, 308.2, 528/487, 490, 498, 500, 501; 159/47.1

(56) References Cited

U.S. PATENT DOCUMENTS

| | | | |
|---|---|---|---|
| 4,223,128 A | 9/1980 | Halek et al. ................. 528/481 |
| 4,563,308 A | 1/1986 | Plantema et al. ......... 260/239.3 |
| 4,703,105 A | 10/1987 | Allada ......................... 528/483 |
| 4,764,323 A | 8/1988 | Al-Ghatta .................... 264/85 |
| 4,902,780 A | 2/1990 | Bourrain et al. ............. 528/483 |
| 4,990,595 A | * 2/1991 | Traechkner et al. ......... 528/483 |
| 5,009,746 A | 4/1991 | Hossain et al. ................ 162/5 |
| 5,049,328 A | 9/1991 | Meyer et al. .................. 264/5 |
| 5,049,647 A | 9/1991 | Al-Ghatta .................... 528/272 |
| 5,073,203 A | 12/1991 | Al-Ghatta ..................... 134/11 |
| 5,080,845 A | 1/1992 | Herrmann et al. ........... 264/101 |
| 5,133,913 A | 7/1992 | Miyakawa et al. ............. 264/5 |
| 5,237,048 A | 8/1993 | Miyakawa et al. ......... 528/483 |

FOREIGN PATENT DOCUMENTS

EP  0233661  8/1987

* cited by examiner

*Primary Examiner*—Fred Teskin
(74) *Attorney, Agent, or Firm*—Donald T. Black

(57) ABSTRACT

The present invention relates to a method for treating plastic polymers to reduce or remove organic contaminants. More particularly, the present invention relates to a method of treating, by continuous means, a flowable polymer mass with a solvating fluid in an environment at which the solvating fluid is in a supercritical state and is subject to conditions sufficient to preferentially solvate and extract organic, and especially non-volatile, contaminants from the polymer mass.

13 Claims, 1 Drawing Sheet

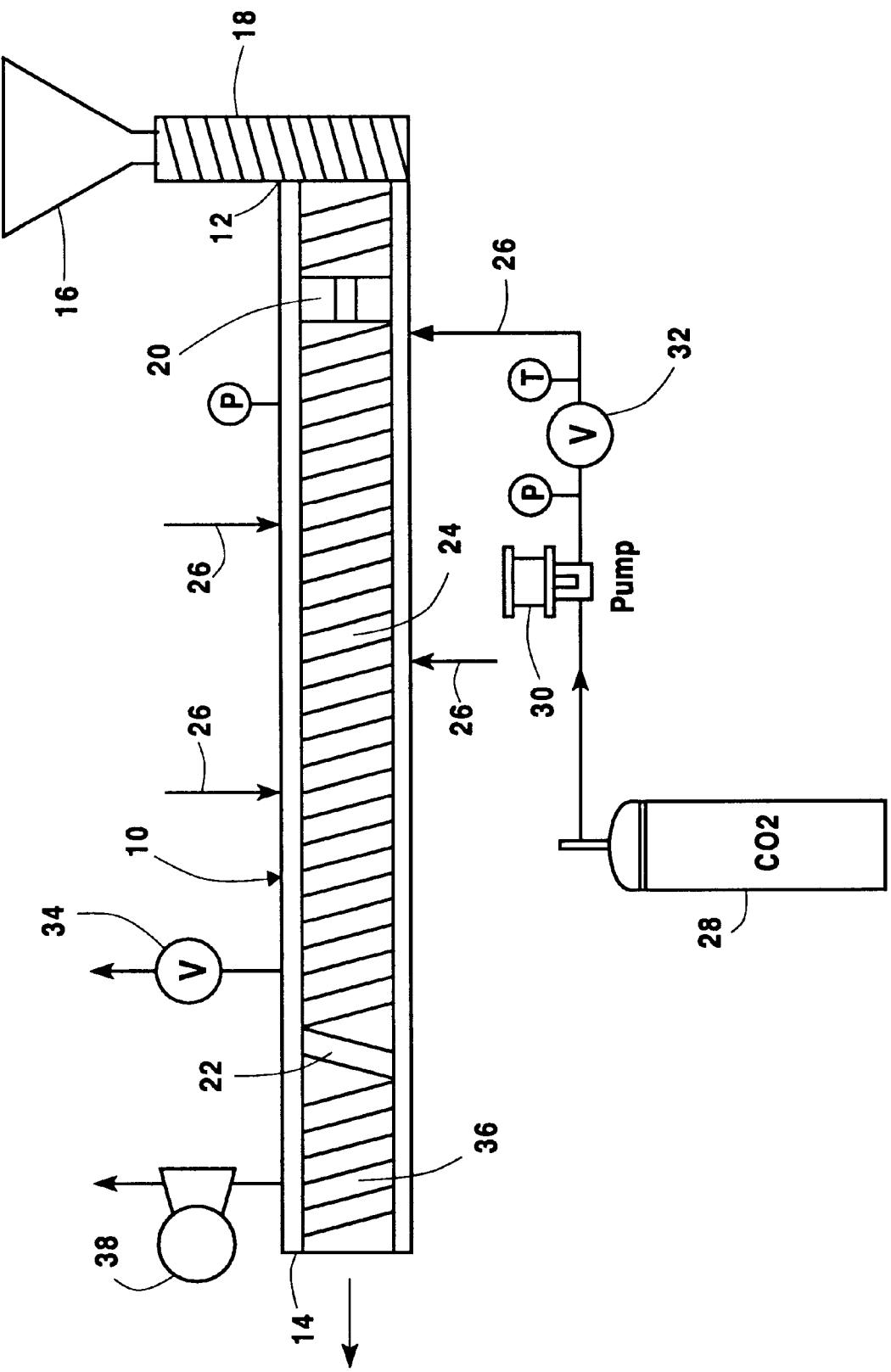

METHODS FOR REMOVING CONTAMINANTS FROM POLYMERS

This application claims priority from U.S. Provisional Application No. 60/005,985, filed Oct. 27, 1995.

FIELD OF THE INVENTION

The present invention relates to a method for treating plastic polymers to reduce or remove organic contaminants. More particularly, the present invention relates to a method of treating, by continuous means, a flowable polymer mass with a solvating fluid in an environment at which the solvating fluid is in a supercritical state and is subject to conditions sufficient to preferentially solvate and extract organic, and especially non-volatile, contaminants from the polymer mass.

BACKGROUND OF THE INVENTION

The plastics industry has recently begun to focus more attention on the use of recycled plastics in the manufacturing of new plastic materials for both industrial chemical and food-grade applications. This has been in response to the public demand for decreasing the amount of waste that we produce (which can lessen our reliance on landfills and waste-to-energy facilities) and for making more efficient use of our resources (e.g., energy).

The plastics industry has recognized that recycled plastics can serve as an economical substitute for virgin materials. The challenge, however, has been to devise appropriate and economical means of processing recycled plastics for use as substitutes for virgin materials for a wide variety of applications.

Although various methods have been developed for processing of recycled plastics, there remains a need to develop commercially efficient and economical means for processing of recycled plastics for use as substitutes for virgin materials, as are normally required for high purity polymeric materials or food-grade applications. Most presently known processes are inadequate for obtaining high purity recycled plastics, for commercial purposes, because such processes are primarily directed to the reduction or removal of volatile or surface contaminants, or are inappropriate to meet industrial demands for high volume and high efficiency processing.

Accordingly, there remains a need to develop processing techniques that remove both volative and non-volatile organic contaminants which can provide high purity polymeric materials from recycled plastic polymer feedstocks for use as substitutes for virgin materials.

In addition, governmental authorities around the world have begun to promulgate regulations for plastic materials to establish basic guidelines for the use of recycled plastics in food-grade applications. The two primary guidelines are as follows: (1) the packaging will not endanger the consumer through product adulteration by migration of material from the package; and (2) the package will not detract from the taste and smell of the food.

The Food and Drug Administration (FDA), the regulating authority in the United States, has established a threshold of regulation for indirect food additives from plastic packaging as 0.5 ppb dietary intake. This threshold level defines the maximum migration from the plastic into the food that the FDA has determined to be an acceptable risk.

In the processing of plastics, this threshold level may be attained in the end use material by reduction or removal of contaminants to this level, or by mixing an appropriate amount of virgin materials with the recycled materials.

The FDA has also devised a test protocol that may be used to determine whether certain recycled plastics meet its threshold of regulation. The FDA has identified the limits for various plastic polymers in conduction with a series of surrogate chemicals that the FDA has deemed to be representative of the estimated 60,000 chemical in commerce.

These surrogates were chosen to represent the various physical and chemical classes of compounds, and cover the categories of polar volatiles, polar non-volatiles, non-polar non-volatiles, non-polar volatiles, and metallics/organometallics. Polar volatiles include chloroform and 1,1,1-trichloro-ethane; polar non-volatiles include diazinon, tetracosane, and benzophenone; non-polar non-volatiles include lindane, squalane, eicosane, and phenyldecane; non-polar volatiles include gasoline and toluene; and organometallics include disodium monomethyl arsonate, zinc stearate and copper II ethyl hexonate.

FDA testing has also provided the threshold limits for various plastic polymers with respect to these chemicals.

Accordingly, it would advantageous to the industry to develop appropriate means to recycle plastics to such purity levels. Various means are known in the art for removal and extraction of impurities and contaminants.

The removal or extraction of impurities and contaminants from a wide variety of plastic polymers using fluids that are at or near supercritical conditions as an extractant or solvating fluid is well known. Extraction of contaminants with supercritical fluids such as carbon dioxide as compared to organic solvents has advantages of lower cost, ease of operation and most importantly eliminates the disposal problems associated with organic solvent waste. However, the processes as known and practical to date generally suffer from inherent disadvantages in that they are either batch processes using one or more extraction vessels such as autoclaves or are slow and/or relatively inefficient in design. The known processes do not result in efficient removal of unwanted contaminants and do not provide a purified polymer in a form that is easily useable without further processing, i.e., without remelting and repelleting.

U.S. Pat. No. 4,563,308 (assignee Stamicarbon) discloses batch removal of impurities from a ethylene-alkene-diene rubber in an autoclave using a supercritical fluid such as carbon dioxide, nitrogen, oxide, nitrogen dioxide, sulfur dioxide, etc. EP Application No. 233,661 (assignee Stamicarbon) discloses the supercritical extraction of impurities from a molten polymer in an extruder in which the exit die functions as a pressure seal to establish a supercritical pressure in the extruder. The supercritical fluid is mixed with the polymer under high pressure in the barrel of the extruder and the impurities become dissolved in the supercritical fluid. The pressure on the mixture is instantaneously released to atmospheric pressure upon exiting the extruder causing vaporization of the impurity containing supercritical fluid from the polymer. This arrangement results in the inability to maintain adequate control over the pressure in the extruder barrel which causes nonuniform flow of the supercritical fluid. This causes erratic flow of the polymer mass in the extruder and produces a nonuniform polymer product, that may be characterized by a foaming of the polymer product or a "popcorn" effect. In order to provide a commercially saleable product, remelting and pelleting of the extruded polymer is generally required. Further, the efficiency of contaminant removal is relatively low.

U.S. Pat. No. 5,237,048 (assignee Toyo Engineering) discloses the removal of volatile impurities from a molten polymer with a supercritical fluid. A wide variety of polymers and supercritical fluids are disclosed and the extraction is carried out under high pressure in a countercurrent extraction tower.

U.S. Pat. No. 4,902,780 (assignee Rhone-Poulene Sante) discloses removal of residual monomers from a styrenevinylpyridine copolymer with supercritical carbon dioxide in an autoclave.

U.S. Pat. No. 4,703,105 (assignee Dow) describes a method for treating a reaction mixture of styrene polymerized with an equal amount or more of acrylonitrile and containing free styrene and acrylonitrile monomers with supercritical carbon dioxide or sulfur hexafluoride in a series of fluid extractors.

U.S. Pat. Nos. 5,049,647, 4,764,323 and 5,073,203 (assignee CoBarr) disclose methods for purifying polyethylene terephthalate resin by contacting the resin with an atmosphere containing carbon dioxide under supercritical conditions in an autoclave.

U.S. Pat. No. 5,049,32 (assignee Airco) and U.S. Pat. No. 5,133,913 (assignee Toyo Engineering) disclose the use of supercritical fluids to both remove volatile impurities from a variety of plastic polymers and to function as blowing agent for foaming the resulting polymer. U.S. Pat. No. 5,009,746 discloses an extensive bibliography directed to the use of supercritical fluids to extract impurities from a wide variety of substrates.

A process for reducing the acetaldehyde content in polyethylene terephthalate chips is disclosed in U.S. Pat. No. 4,223,128 to Hallick, et al. The process comprises stabilizing the polyethylene terephthalate by heating it at an elevated temperature in air and maintaining an air to chip ratio at a predetermined value of at least about 0.8 standard cubic foot of air per minute/pound of resin per hour and at a vapor velocity of at least about 0.5 foot per second.

U.S. Pat. No. 5,080,845 (assignee Werner & Pfleidere) discloses the removal of impurities from plastic polymers in two serially connected extruders using supercritical carbon dioxide in the first extruder. In the first extruder, the plastic polymer is contacted with an extraction gas at supercritical pressure to dissolve the impurities. The mixture of the plastic polymer and the carbon dioxide is then transferred through a pressure-relief valve to a second extruder. In the second extruder, the reduced pressure instantaneously vaporizes the supercritical carbon dioxide containing dissolved impurities, which is vented from the polymer. The polymer is then subjected to vacuum for removal of any residual gases and extruded as granular product. The reduced pressure in the second extruder operates to promote separation of the carbon dioxide from the polymer as a gas, but will not carry off non-volatiles which will be reabsorbed into the molten polymer.

There are two basic types of impurities which occur with respect to polymers in which the method of the present invention has utility. Some virgin plastics, upon polymerization contains a distribution of species having different molecular weights. The low molecular weight components comprising unreacted short chain monomers, diners etc., collectively referred to as oligomers, must be significantly reduced for many end uses of the fully reacted polymer. The removal of low molecular oligomers eliminates problems of noxious hydrocarbon vapor formation during processing and generally improves the handling and workability of the polymer end product. The oligomers are also preferably removed if the polymer is intended for use in food applications, for example as packaging, to avoid permeation or leaching of the oligomers from the packaging material into the food product.

The second type of impurity or contaminant is ordinarily found in refuse plastic which contain impurities resulting from contact with a material during prior usage. In some instances, these impurities may be toxic or hazardous and desirably are removed in order to avoid having to dispose of the refuse in a hazardous material site. In other instances, to which the present invention is particularly directed, plastic materials obtained from ordinary refuse collection may be processed to low impurity levels such that they may replace all or part of the virgin polymer raw material in the manufacture of second generation articles.

The present invention is particularly useful in the removal of unwanted contaminants from high density polyethylene (HDPE). HDPE is a common resin material for blow molded bottles which are used for the storage of milk, detergents, pesticides and motor oil and a significant amount of HDPE is used in consumer product packaging. Polyethylene's properties, particularly HDPE, allow it to be reprocessed, i.e., recycled. A significant concern in recycling polyethylene is the trace levels, i.e., less than 200 ppm, of contaminants inherently associated with the recycle HDPE stock that cannot be removed by conventional washing procedures. In many cases, the contaminant, for example, d-limonene, benzene, toluene, permeates into the plastic through absorption or adsorption. Reprocessing of HDPE by conventional remelting in an extruder may result in the generation of volatile contaminant fumes which may be harmful to the environment and to personnel operating the equipment, and which, if not substantially removed from the reprocessed HDPE, will prevent the recycled HDPE from being used in many applications, for example in containers for foods intended for human consumption The method of the present invention can be used to remove unwanted contaminants from both virgin polymers and from recycled polymers. As more fully set forth herein, the method is readily practiced in the efficient removal of unwanted contaminants. When used to process polymers collected as refuse, the process can-upgrade in the value of the processed material in the marketplace.

DESCRIPTION OF THE DRAWINGS

FIG. 1 is a schematic diagram of the method of the invention to remove unwanted contaminants from polymers.

SUMMARY OF THE INVENTION

In its broadest sense, the invention is directed to the continuous removal of one or more undesired contaminants from a molten or substantially molten plastic polymer flowing through a treatment zone in which there is established a treatment environment at which the polymer is substantially molten. A solvating fluid that is supercritical at or near the conditions of the treatment environment and which is a preferential solvent for one or more of the undesired contaminants at the treatment environment conditions is injected into the treatment zone into intimate contact with the molten polymer in the treatment zone thereby causing the undesired contaminants to become dissolved in or otherwise preferentially associated with the supercritical fluid, i.e., by dissolution, absorption, entrainment, etc. The supercritical fluid carrying with it the undesired contaminant or contaminants is thereafter vented or otherwise removed from the treatment zone leaving behind a polymer of improved purity which can be further processed as desired. The purified polymer may be recovered from the treatment zone, degassed and pelleted in a conventional manner. The solvating fluid may include one or more modifier fluids which enhance the solvating ability of the supercritical fluid for certain contaminants as discussed more fully hereinafter.

Preferably the removal of unwanted contaminants is effected in a treatment zone established within the barrel of a twin screw extruder. One example of a twin screw extruder that may be utilized in the practice of the present invention is that sold by American Leistritz, Model No. LSM34GG. The mechanical details of the extruder and its operation do not form a part of this invention except to the extent that the extruder is operated in order to maximize the contact between the polymer mass and the supercritical solvating fluid in order to cause removal of unwanted contaminants. A single screw extruder may be used if desired, and in some instances may be preferred.

It is important to the present invention to create a treatment zone within the barrel of the extruder which is maintained at a particular temperature and pressure, depending upon the polymer being treated, that creates a treatment environment that enhances removal of unwanted contaminants from the polymer mass. The treatment environment is selected to maintain the polymer in a flowable state such that it can be readily transported in and out of the treatment zone, i.e., in an extruder. Preferably, the treatment environment is selected so that the polymer is maintained in a flowable molten state and is of a viscosity such that it can be readily conveyed through the treatment zone by the extruder screw impeller. It is to be understood that there may be isolated bits or pieces of solid or semisolid polymer within the polymer mass, the key being that the polymer be sufficiently flowable that it is transportable through the extruder and can be intimately mixed with the supercritical fluid in order to cause transfer, i.e., dissolution, of the unwanted contaminants into the supercritical fluid phase for subsequent removal from the treatment zone and the extruder.

While it is possible for the treatment zone to comprise substantially the entire extruder barrel with suitable pressure seals or similar mechanical devices at the extruder entrance and exit in order to maintain the treatment conditions within the treatment zone, it has been found to be preferable to have the treatment zone comprise a portion of the extruder barrel upstream of the extruder exit followed by a lower pressure degassing zone (also referred to herein as the "vacuum zone") downstream of the treatment zone between the treatment zone and the extruder exit. A degassing zone has been found to be desirable in order to insure delivery of a homogeneous molten polymer mass at the extruder exit for further processing and to insure complete removal of residual gases from the polymer mass.

It may also be desirable to treat the polymer in a plurality of treatment zones depending upon the nature of the unwanted contaminants present and the degree of polymer purity desired. The plurality of treatment zones may be contained within a single extruder or in different extruders, as may be desired. The solvating fluid may be introduced into the treatment zones at a single point or at multiple points which may be spaced circumferentially of the extruder barrel as well as axially along the barrel.

Any one of a wide number of materials may be used as the supercritical solvating fluid depending upon the polymer being purified, the contaminants being removed, and the purity being sought in the polymer product. The solvating fluid should be supercritical at or near the treatment environment conditions in order that it will act as a solvating agent for one or more of the unwanted contaminants present in the polymer raw material. Generally, the supercritical solvating fluid is a known supercritical fluid which exhibits supercritical properties at treatment environment conditions that are sufficiently mild that the polymer being treated does not become degraded. Examples of supercritical solvating fluids that may be used in the disclosed process include carbon dioxide, carbon monoxide, sulfur dioxide, nitrogen dioxide, nitrous oxide, methane, ethane, propane, steam, ethylene and propylene and mixtures thereof. A preferred fluid for reasons of economy, lack of toxicity and desirable supercritical thresholds is carbon dioxide which has a critical temperature of 31° C. and a critical pressure of 73 bar. Supercritical carbon dioxide also has the desirable effect of lowering the intrinsic viscosity of most molten polymers, and particularly HDPE, at the treatment conditions which enhances the contact between the supercritical carbon dioxide and the polymer mass which increases the efficiency of contaminant separation. Other fluids having desirable solvating properties and supercritical thresholds are considered to be within the skill of the art.

As indicated, it is contemplated to include one or more modifiers in the solvating fluid which enhance the solvating properties of the supercritical solvating fluid for the unwanted contaminants. The use of such modifiers is well known, examples being methanol and isopropanol to enhance the removal of polystyrene oligomers and polynuclear aromatic hydrocarbons. The identification of a wider variety of modifiers that may be used with supercritical carbon dioxide as well as other supercritical fluids is set forth in Supercritical Fluid Technology, A.C.S. Symposium Series 488, Am. Chem. Soc., 1992, pp. 336–361.

The present invention may be employed to purify a wide variety of polymers, and particularly those that are molten at temperatures and pressures that may be conveniently established in an extruder operating environment, at temperatures within the range of between about 150° C. and about 400° C. Examples of polymers suitable for purification in accordance with the present invention include polyolefins, polyesters, polyamides, polyacrylonitrile, and polystyrene, and more specifically polyethylene, polypropylene, polyethylene terephthalate and nylon. As stated, the disclosed process is particularly suited to recover purified HDPE from recycle scrap. Other recycled polymers that may be purified as described herein will be apparent to those skilled in the art.

The method of the invention provides a highly efficient continuous process to efficiently remove unwanted contaminants from polymers. The principal contaminants that are conveniently removed by the disclosed process are low molecular weight oligomers that are present in the reaction mixture resulting from the polymerization reaction. The present invention contemplates removal of such unwanted contaminants as a purification step in the overall polymer production process or as a subsequent processing step performed on the virgin polymer prior to use of the polymer in subsequent processing or fabrication operations.

The present invention has also been found to be of significant commercial value in the processing of recycled polymer articles that, due to their environment during usage, for example as a container, have become contaminated with one or more materials that may interfere with their ability to be reformulated and reused. One example of a contaminated container that may be processed in accordance with the disclosed invention are containers used for storing and transporting toxic chemicals such as solvents, etc. which have heretofore not been able to be recycled into certain uses such as food containers due to the inability to remove residual toxic contaminants to the low levels mandated for food uses. Other examples of contaminated plastic containers include pesticide containers, motor oil containers and milk cartons.

DETAILED DESCRIPTION OF THE INVENTION

Referring to FIG. 1, there is schematically illustrated an extruder 10 having an inlet 12 and an exit 14. The polymer to be purified, for example HDPE in particulate powder or chip form, is delivered from a hopper 16 into a suitable premelt extruder 18 where it is melted into a molten mass and delivered to the inlet of extruder 10. First and second spaced apart pressure seals 20 and 22 are disposed within the barrel of extruder 10 defining therebetween a treatment zone 24 which is maintained at a desired temperature and pressure defining supercritical treatment conditions for the solvating fluid at which the HDPE is a flowable molten mass. When the solvating fluid is carbon dioxide and the polymer mass is HDPE, the treatment conditions may be between about 18020 C. and about 250° C. and between about 80 bar and about 200 bar.

One or more inlets 26 are provided for injecting of a carbon dioxide solvating fluid. The solvating fluid inlets 26 may be spaced along the barrel of the extruder, and may be arranged so that the solvating fluid is introduced circumferentially of the barrel as well as at spaced longitudinal points as may be desired.

As shown in FIG. 1, liquefied carbon dioxide is withdrawn from a suitable vessel 28 and pumped by pump 30 to injection inlets 26. Control valve 32 controls the flow rate of the carbon dioxide entering the treatment zone 24 via inlets 26 when it intimately contacts and mixes with the molten HDPE flowing through treatment zone 24, the unwanted contaminants becoming dissolved or otherwise associated with the supercritical carbon dioxide.

The supercritical carbon dioxide containing dissolved unwanted contaminants is withdrawn from the treatment zone 24 via any suitable venting arrangement 34 which seals the extruder against pressure leakage as is well known in the prior art. The extruder includes a mixing zone 36 downstream of the treatment zone 24 which is vented to the atmosphere or a suitable collection device, not shown, via vacuum vent 38 maintained at a vacuum of between about −500 and about −900 mbar gauge in order to remove any remaining solvating fluid, i.e., carbon dioxide and associated contaminants, from the polymer and to reduce the pressure on the polymer mass essentially to atmospheric pressure to permit convenient extrusion of the purified polymer from the extruder without excessive blowing or out gassing that might occur if the polymer was extruded directly from the high pressure conditions within the treatment zone to the ambient surroundings. The carbon dioxide exiting the treatment zone 24 via vent 34 is preferably at a pressure of from about 80 to about 200 bar and a temperature of from about 80° C. to about 120° C. The carbon dioxide to polymer ratio in the treatment zone is preferably in the range of from about 0.2:1.0 to about 5:1. The polymer preferably has a residence time in the treatment zone of from about 2 to about 20 minutes.

The following experiments were conducted in order to demonstrate the improved efficiency of continuous removal of impurities from recycle HDPE with supercritical carbon dioxide in a single treatment zone extruder. The extruder was an American Leistritz twin screw extruder of the type schematically illustrated in FIG. 1. The extruder had a diameter of 34 mm and had 12 heating zones. The treatment zone was 660 mm in length and the degassing zone was 400 mm in length. Temperature within the treatment zone was controlled in the range of 180–200° C. Molten plastic was fed into the twin screw extruder from a 2.54 cm single screw premelt extruder. The mass flow rate of plastic fed to the twin screw extruder was 4–5 kgs/hr with a screw speed in the range of 100–200 rpm.

The HDPE plastic raw material was obtained from curb side collection of high density polyethylene bottles used to contain detergents, fabric softeners, shampoos and other industrial cleaning materials. The bottles were triple rinsed with water and dried before grinding. For control experiments, naphthalene flakes were premixed with virgin HDPE powder obtained from Solvay under the tradename B-54-25-H by thoroughly shaking and tumbling.

Carbon dioxide was used as the supercritical solvating fluid for the experiments, although nitrogen was also used to check the solubility versus sweeping effect of the supercritical fluid. Liquid carbon dioxide at room temperature was drawn from a cylinder having a dip tube and a Haskel pump was used to pressurize the carbon dioxide of 100 to 200 atm. A pressure probe was used to measure the pressure inside the treatment zone. The flow rate of supercritical carbon dioxide was measured using a turbine flow-meter before it was injected into the treatment zone. To prevent high pressure carbon dioxide from exiting at the die and foaming the plastic, and to maintain a supercritical pressure inside the treatment zone, a set of melt seals were used. These dynamic seals were formed by using either a reverse flight element or a shearing disk. Supercritical carbon dioxide containing dissolved contaminants were removed before the second melt seal via a vent-stuffer device with a throttle valve. The vent-stuffer device created a pressure seal effectively preventing escape of the molten plastic from the extruder while permitting releasing of the carbon dioxide through the throttle valve. This throttle valve was also used to adjust the carbon dioxide flow rate and the pressure in the treatment zone. The temperature of the carbon dioxide exiting the treatment zone was in the range of 80–120° C. A vacuum pump adjacent the exit end of the extruder was used to remove any residual carbon dioxide and/or contaminant fumes. The purified plastic polymer free from contaminants was extruded from the extruder exit and cooled in a water bath, after which it was pelletized and stored in glass jars for analysis.

Analysis of each plastic sample for contaminants was performed using a Hewlett Packard 5890 Series II GC/MS. Before analysis, plastic samples were extracted for 16 hours using an automated Soxhlet 2000 Extractor at 150° C. with methylene chloride as the solvent. Each sample was analyzed three times, and a mean was reported.

EXAMPLE I

This experiment was carried out in the described intermeshing counter-rotating twin screw extruder operating at a screw speed of 100 rpm. The raw material feedstock was recycled HDPE obtained from curbside refuse collection ground into chips of approximately 0.5 inch×0.25 inch. The chips were fed via a feed hopper into a premelter maintained at a temperature of about 200° C. to provide a molten feed into the extruder.

A control sample of the contaminated recycle stock was processed through the extruder at a rate of 2.7 Kg/hr. without introduction of any solvating fluid in the treatment zone which was maintained at a temperature of 200° C. A vacuum of −700 mbar gauge was drawn on the degassing zone adjacent the extruder exit.

A second sample of the identical raw material was then processed using supercritical carbon dioxide as the solvating fluid. Carbon dioxide at a pressure of 100 atm and temperature of 20° C. was introduced at a flow rate of 3.0 Kg/hr. into the treatment zone which was at a temperature of 200° C. A carbon dioxide contaminant containing stream was vented from the treatment zone at a pressure of 100 bar. The residence time of the molten polymer in the treatment zone was 3.5 minutes.

Samples of the control and extracted samples were extracted with methylene chloride for 16 hours and were analyzed as set forth above. The results obtained were as follows:

| Identified Contaminants | Control (ppm) | Treated (ppm) | % Removed |
|---|---|---|---|
| Camphene | 6.64 | N.D.* | >99 |
| d-Limonene | 19.04 | 2.34 | 87.7 |
| Benzene, 1-methyl-4-(1-methylethyl) | 7.90 | N.D. | >99 |
| Dodecane | 6.51 | N.D. | >99 |
| Tetradecane | 16.75 | 4.37 | 73.91 |
| 1-Tetradecane | 8.24 | N.D. | >99 |
| 4-tert-Butylcyclohexyl acetate | 6.36 | N.D. | 99 |
| 1-Hexadecane | 7.58 | 2.62 | 65.49 |
| Total | 79.02 | 9.33 | 88.20 |

EXAMPLE II

Samples of recycled HDPE bottles obtained from quantum recycling were processed under conditions as in the preceding example and the following results were obtained:

TABLE 2

| Identified Contaminants | Control (ppm) | Treated (ppm) | % Removed |
|---|---|---|---|
| Carene | 12.86 | 2.69 | 79.08 |
| d-Limonene | 94.84 | 9.74 | 89.73 |
| Dodecane | 14.65 | N.D. | >99 |
| Tridecane | 12.27 | N.D. | >99 |
| Tetradecane | 27.56 | 5.38 | 80.47 |
| Tetradecane | 23.35 | 4.40 | 81.15 |
| Pentadecane | 11.92 | 3.03 | 74.59 |
| Hexadecane | 23.32 | 6.63 | 71.56 |
| Hexadecane | 14.03 | 5.77 | 58.86 |
| Dodecanoic Acid | 17.80 | 6.69 | 61.82 |
| Octadecane | 17.20 | 9.38 | 45.50 |
| Cyclotetradecane | 60.44 | 38.46 | 36.37 |
| Nonadecane | 46.39 | 29.29 | 36.86 |
| Hexadecanoic Acid | 20.84 | 10.46 | 48.93 |
| Tetracosane | 17.42 | 13.51 | 22.47 |
| Phosphoric Acid | 25.01 | 21.71 | 13.19 |
| Docosene | 22.01 | 18.08 | 17.19 |
| Total | 461.92 | 185.5 | 59.84 |

EXAMPLE III

The relative effectiveness of carbon dioxide and nitrogen as the solvating fluid was compared by treating virgin high density polyethylene powder contaminated with approximately 0.5 percent by weight naphthalene (m.p. 80–820° C.) in an extruder of the type described in the above examples above. The treatment conditions were as follows:

| Source | Virgin HDPE + Naphthalene (m.p.: 80–82° C.) |
|---|---|
| Type of Material | HDPE Powder, melt index − .40 (2160 gm/190° C.) |
| $CO_2$ Temperature | 20° C. |
| $CO_2$ Pressure | 200 atm |
| $N_2$ Pressure | 200 atm |
| $N_2$ Temperature | 20° C. |
| Flow Rate of $CO_2$ | 3.6 kg/hr |
| Flow Rate of $N_2$ | 3.6 kg/hr |
| Temperature of treatment & mixing zones | 210–220° C. |
| Vacuum | −700 mbar |
| Screw speed | 120 rpm |

The resulting polymer was extracted with methylene chloride and analyzed as described to determine the amount of naphthalene removed. As seen in the following table, carbon dioxide was superior to nitrogen in removing naphthalene under the operating conditions of the experiment.

TABLE 3

| Fluid | Control % by weight | Treated % by weight | % Removed |
|---|---|---|---|
| $CO_2$ | 0.56 | 0.035 | 93.75 |
| $N_2$ | 0.52 | 0.22 | 57.70 |

EXAMPLE IV

These experiments were performed on polyethylene terephthalate (PET). Source of recycled PET flakes was two liter post industrial bottles. These bottles were ground into chips (flakes) of approximate size 0.3 "×0.2". These chips were contaminated purposely with lindane and toulene as follows:

A mixture of lindane and toulene was prepared with 90% toulene and 10% lindane.

This mixture was thoroughly mixed with PET flake and stored for two weeks at 40° C. with periodic agitation.

Contaminant was drained and PET flake was put through a commercial washing process.

After washing, the contaminated flake was blended with curbside recycled PET, one part contaminated flake and 2 parts curbside recycled PET flake.

PET is a hygroscopic material and it absorbs moisture easily. Before PET was processed, it was dried in a Novatech drier at a temperature of 310° F. Dry PET was fed to the extruder where it was cleaned using supercritical carbon dioxide. Treated PET was collected and analyzed using a Soxhlet extraction method.

Extraction experiments were performed twice, only difference between the two being the amount of time the contaminated PET was dried before subjecting to extraction process.

Results:

Extraction efficiency for toulene and lindane is shown in Table 1.

TABLE 4

| Sample ID | Description | Lindane (ppm) | Toluene (ppm) |
|---|---|---|---|
| 1. | Initial Blend | 150 | 8680 |
| 2. | Control 1: (Dryer-4.5 hr @ 310° F.) | 88.9 | 1850 |
| 3. | Treated 1: (1200 psi CO$_2$/ vacuum | 10.2 | 21.2 |
|  | Percentage Removed | 88.5 | 98.9 |
| 4. | Control 2: (Material held in dryer for 48 hr at reduced temp.) | 54 | 475 |
| 5. | Treated 2: (1200 psi CO$_2$/ vacuum | 5.6 | 15.7 |
|  | Percentage Removed | 89.6 | 96.7 |

We claim:

1. A method of treating a polymer to remove an organic contaminant comprising the steps of:
   a. melting a polymer containing an organic contaminant into a flowable polymer mass,
   b. introducing said flowable polymer mass into an enclosed space comprising a treatment zone and a degassing zone and means for maintaining continuous movement of said flowable polymer mass in a direction through said enclosed space from said treatment zone to said degassing zone,
   c. contacting said flowable polymer mass in said treatment zone with a solvating fluid in a supercritical state to dissolve said contaminant into said solvating fluid, wherein said treatment zone is maintained at temperature and pressure conditions sufficient for dissolving said contaminant and maintaining the supercritical state of said solvating fluid,
   d. separating and venting the solvating fluid in its supercritical state containing the dissolved contaminant from said flowable polymer mass to provide a purified polymer in said treatment zone, prior to entry into the degassing zone,
   e. depressurizing said purified polymer upon entry into said degassing zone to substantially vaporize any entrained solvating fluid in said purified polymer and removing the vapor from said degassing zone, and
   f. recovering a purified polymer substantially free of contaminant and solvating fluid from said enclosed space, wherein said enclosed space is maintained at a temperature sufficient to keep said polymer in a flowable state, and said treatment zone is maintained at a pressure sufficient for keeping the solvating fluid in a supercritical state.

2. The method of claim 1 wherein the supercritical pressure is maintained in said treatment zone by means of dynamic pressure seals at the entry of said enclosed space and between said treatment zone and said degassing zone.

3. A method of claim 1 wherein said solvating fluid is contacted in a co-current direction with said flowable polymer mass.

4. A method of claim 1 wherein said solvating fluid is contacted in a counter-current direction with said flowable polymer mass.

5. A method of claim 1 wherein said solvating fluid is selected from the group consisting of carbon dioxide, steam, sulfur dioxide, nitrogen, nitrous oxide, nitrogen dioxide, methane, ethane, propane, ethylene, propylene and mixtures thereof.

6. A method of claim 5 wherein said solvating fluid is carbon dioxide.

7. A method of claim 6 wherein said carbon dioxide contacts said flowable polymer mass at an initial temperature of between about 65° F. to about 85° F. and a pressure of between about 1100 psig to about 4000 psig.

8. A method of claim 1 wherein said polymer is selected from the group consisting of polyolefins, polyesters, polyamides, polyacrylonitrile, and polystyrene.

9. A method of claim 1 wherein said polymer is selected from the group consisting of high density polyethylene, polypropylene, polyethylene terephthalate, and nylon.

10. A method of claim 1 wherein said contaminant is a chemical selected from the group consisting of non-polar volatiles, polar volatiles, non-polar non-volatiles, polar non-volatiles, metallics/organometallics, and mixtures thereof.

11. A method of claim 1 wherein said contaminant is selected from the group consisting of monomers, oligomers, short chain compounds, and mixtures thereof.

12. A method of treating a polymer to remove a non-volatile organic contaminant comprising the steps of:
   a. melting a polymer containing an organic contaminant into a flowable polymer mass,
   b. introducing said flowable polymer mass into an enclosed space comprising a treatment zone and a vacuum zone and means for maintaining continuous movement of said flowable polymer mass in a direction through said enclosed space from said treatment zone to said vacuum zone,
   c. contacting said flowable polymer mass in said treatment zone with a solvating fluid in a. supercritical state to dissolve said contaminant into said solvating fluid, wherein said treatment zone is maintained at temperature and pressure conditions sufficient for dissolving said contaminant and maintaining the supercritical state of said solvating fluid,
   d. separating and venting the solvating fluid in its supercritical state containing the dissolved contaminant from said flowable polymer mass to provide a purified polymer in said treatment zone, prior to entry into the vacuum zone,
   e. depressurizing said purified polymer upon entry into said vacuum zone to vaporize entrained solvating fluid,
   f. vacuum degassing vaporized solvating fluid from said purified polymer in said vacuum zone, and
   g. recovering a purified polymer substantially free of contaminant and solvating fluid from said vacuum zone of said enclosed space, wherein said enclosed space is maintained at a temperature sufficient to keep said polymer in a flowable state, and said treatment zone is maintained at a pressure sufficient for keeping the solvating fluid in a supercritical state by means of dynamic pressure seals at the entry of said enclosed space and between said treatment zone and said vacuum zone.

13. A method of claim 12 wherein said treatment zone is maintained at a pressure of between about 1100 psig vacuum zone is maintain pressure.

* * * * *